April 18, 1933.   A. R. HITCH   1,904,464
PROCESS OF PRODUCING HIGH GRADE ROSIN
Filed Dec. 14, 1929
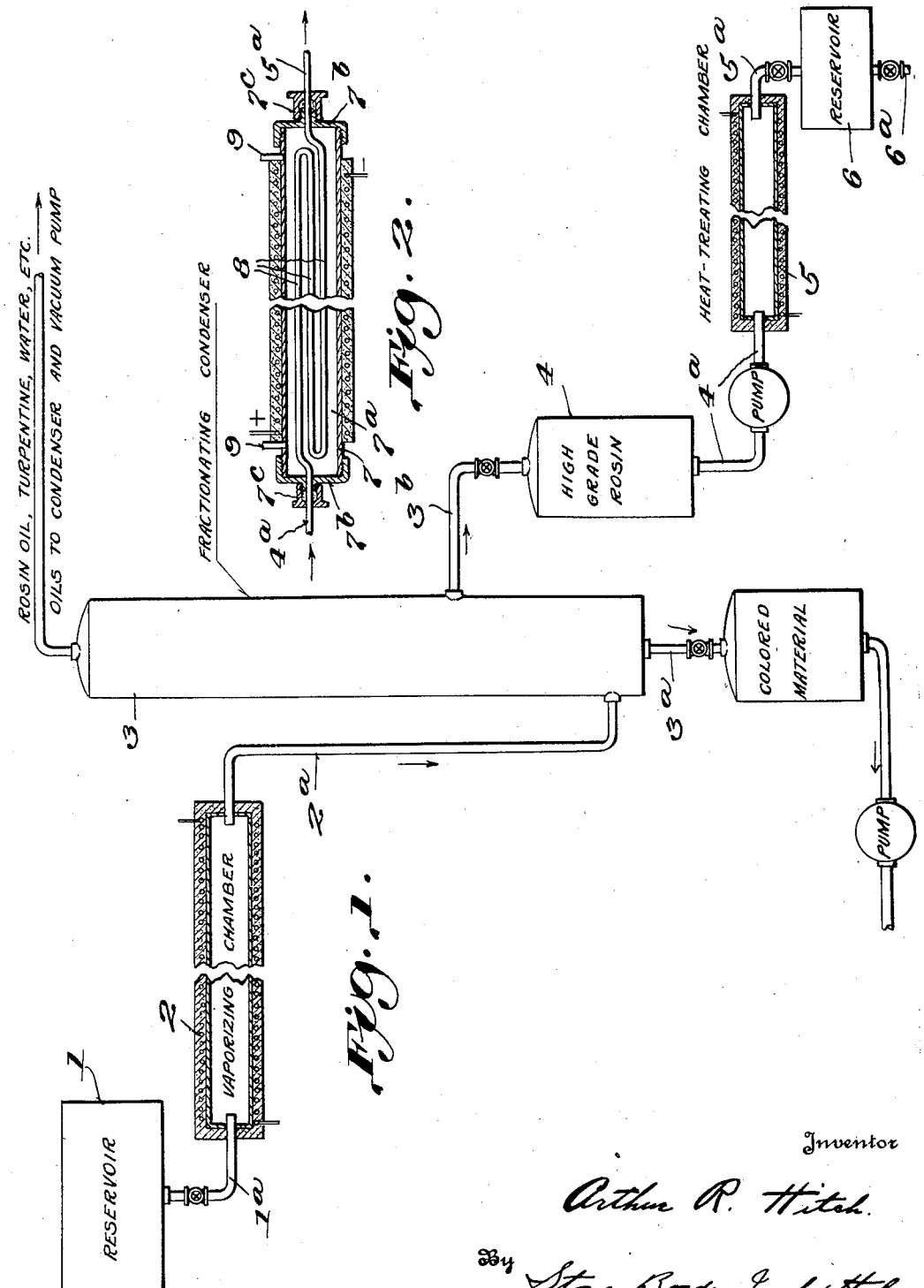

Patented Apr. 18, 1933

1,904,464

UNITED STATES PATENT OFFICE

ARTHUR R. HITCH, OF BRUNSWICK, GEORGIA, ASSIGNOR, BY MESNE ASSIGNMENTS, TO GILLICAN-CHIPLEY COMPANY, A CORPORATION OF DELAWARE

PROCESS OF PRODUCING HIGH GRADE ROSIN

Application filed December 14, 1929. Serial No. 414,140.

This invention relates to a new process for the rapid distillation of rosin materials to produce a high grade distilled rosin.

The invention also provides for the production of a superfine product which has the outstanding characteristic of being substantially free from the tendency to crystallize, a fault of most all distilled rosin.

Heretofore, in the ordinary methods used, the distillation of rosin proceeds slowly, even under high vacuum, and aided with steam or inactive gases. This is due to the fact that rosin is a material having a very low vapor pressure. It has now been found that the distillation of rosin materials can be made to take place very rapidly and continuously, and high grade distilled rosin produced, if rosin materials are admitted into a vaporizing pipe, or chamber, or column, or into any other means of obtaining complete vaporization of the material under high vacuum, for example, from 24 to 29 inches of mercury, such that all of the desired constituents present are quickly and continuously converted into the vapor form. The vapors produced, especially those of the highly colored bodies and the rosin, are condensed fractionally in a suitable equipment such as a fractionating tower, and these condensed fractions are then drawn off continuously, thus giving two distinct products, namely, a small amount of a material high in color, and a large amount of rosin of very high grade. The water and turpentine or solvents used are condensed by properly arranged condensers or a condensing tower so constructed that the desired fractional condensation of the required products is obtained. Thus, this process is made to be continuous.

Examples of rosin materials to be treated are filtered crude pine gum alone, or filtered crude pine gum diluted with solvents, or gum or wood rosin diluted with solvents. The treatment in the vaporizing pipe, or chamber, or column, may be conducted with or without the use of aeriform material, such as steam or inactive gases, such as carbon dioxide, hydrogen, or hydrocarbon gases which may be admitted along with the rosin material.

Heretofore, by the ordinary methods used for the distillation of rosin, a mass of rosin or rosin material is heated in batches in such a way that all of the volatile constituents except most of the colored bodies, dirt, etc., are distilled from the still and properly condensed, the whole mass thus being heated for a considerable period of time, and the distillation takes place slowly, the operation being of a batch or noncontinuous type. By other methods, the rosin is entirely vaporized with or without the addition of steam or carbon dioxide and the various constituents fractionally condensed. In the present improvement, there is used a rosin material containing considerable volatile solvent such as turpentine, gasoline, alcohol, etc., and this material is heated in such a fashion that the entire amount of any given portion is converted into a vapor form and then treated to fractionally condense the various constituents, as desired. The rosin material is therefore heated for only a very short period of time; the distillation is controlled to take place very rapidly; the process is continuous; and the majority of the rosin obtained is of very high grade.

The following examples will serve to illustrate the manner in which this invention may be conducted. Ordinary crude pine gum filtered free from all foreign suspended matter is sprayed or atomized into a long pipe heated so that all of the material is raised to a temperature of approximately 340° C., at which temperature all of the material is entirely vaporized. The vapors are then condensed in a series of condensing flasks or zones arranged at various temperatures. In the first flask having a temperature of about 270° C. most all of the colored bearing constituents are condensed and retained. The second flask having temperature of about 210° C. will condense the majority of the light colored high grade distilled rosin. In the third having a temperature of about 160° C. most of the rosin oil is condensed. The water and turpentine are condensed by any suitable vapor condenser. The entire system is maintained under a high vacuum of about 28.5 inches of mercury.

In lieu of crude gum and in accordance with this invention, it has been found that either gum rosin or wood rosin dissolved in various solvents such as turpentine, gasoline, etc. can be used in the same manner as the crude gum, which latter itself is composed of approximately 73 percent rosin, 22 percent turpentine, and 5 percent water. It has also been found that steam, or various inactive gases, can be injected in the vaporizing pipe or chamber along with the rosin mixture to increase the rate of distillation. Further, it has also been determined that in lieu of a series of condensing flasks for collecting the various fractions consisting of colored material, distilled rosin, and rosin oil, etc., a properly arranged column may be used, and the desired fractions can be drawn off in a condensed operation. The entire process is arranged to function continuous throughout. By this procedure, distillation of the rosin material proceeds very rapidly, and is continuous, and the greater portion of the distilled rosin obtained is of high color and high purity.

Fig. 1 illustrates diagrammatically the apparatus, the vaporizing and heating treating chambers being shown in section;

Fig. 2 shows the details of the heat treating chamber.

Referring to the attached drawing, there is illustrated diagrammatically the several essential parts of apparatus including a fractional condenser and in which apparatus the process may be conducted continuously. 1 represents a closed reservoir for the rosin material, and which reservoir may be either heated or unheated, but preferably heated. From the reservoir 1, the rosin material is led through a pipe $1^a$ to a vaporizing tube or chamber 2, which is suitably heated, as by means of an electrical element, or by a heat jacket containing a suitable fluid medium such as molten lead or lead alloy. The rosin material is introduced in the form of a spray into the chamber 2 and is substantially instantaneously vaporized. Next, the rosin vapors are conducted through a pipe $2^a$ into a tower condenser of suitable type 3 comprising a column having horizontal plate partitions with bubble caps arranged so that the condensed materials may be drawn off at suitable levels. Condensed material containing the major portion of colored impurities are led off from the lower portion of the condenser 3 through a pipe $3^a$ and such materials are probably condensed at about 270° C. Higher up at a condensing zone of about 210° high grade rosin material is drawn off through the pipe $3^b$ and treated in accordance with the procedure hereinafter to be specifically described. Still higher up in the column at a condensing zone of about 170° C., most of the rosin oil can be condensed and led off through a properly arranged pipe or if desired the rosin oil together with the turpentine and water can be allowed to vaporize from the condenser and then fractionated in a separate condenser. The temperature at which the various condensing portions of the condenser is maintained is dependent upon the vacuum maintained in the system, the lower the pressure the lower the temperature required.

Referring more particularly to the high grade rosin material drawn off to the pipe $3^b$, it is important to note that this high grade rosin thus produced by this process of vaporization and fractional condensation has, like other rosin, considerable tendency to crystallize, which property renders the rosin objectionable for certain industrial uses. To remedy this feature, and yet make the process continuous, it has been determined that the desired property of noncrystallization may be imparted to the rosin, if the reservoir 4 be connected to a relatively long coil of pipe, preferably of aluminum, encased in a heating chamber 5 maintained at a temperature of approximately 285° C. however the temperature will be dependent much upon the rate of flow of the rosin through the pipe, the rate of flow in turn will be dependent upon the size of the pipe. In other words, the period of treatment and the temperature to which the aluminum pipe and its contents are heated may vary, according to the quantity of rosin undergoing treatment. The important factor, however, is that a relatively high grade rosin is subjected, while in travel through an extended heated zone, to a very considerable temperature, in order to produce the desired characteristic of noncrystallization. The period of treatment may also vary, depending on the total content treated, and on the temperature.

The pipe 5 may be heated by any suitable means, as in the case of the chamber 2, by use of a bath of molten lead alloy, high boiling oils, fused salts, etc. The treatment in the pipe 5 may be either with or without the vacuum treatment. Products leaving the outlet end of the pipe 5 are conducted through a pipe $5^a$ to a reservoir 6, in which is accumulated the heat treated rosin, and an outlet pipe $6^a$ may be used to draw rosin from the reservoir to fill barrels for shipment.

Figure 1 illustrates the location of the heating zone pipe or chamber 5 between the tank 4 and the final reservoir 6, and in position to receive high grade rosin from the tank 4 through the pipe $4^a$. In Figure 1, the chamber 5 is shown merely diagrammatically. The preferable details of this unit are illustrated in somewhat larger scale in Figure 2, in which the pipe $4^a$ is shown as a relatively small tube preferably of aluminum and having an internal diameter of about one-half inch. This aluminum tube $4^a$ extends into an iron pipe or heating jacket 7 having a central space $7^a$, end cover plates $7^b$ equipped with packing glands 7ᶜ to provide a liquid tight fitting around the aluminum tube where it enters as the pipe 4ᵃ and leaves the chamber as the pipe 5ᵃ. Within the space 7ᵃ, the tube 4ᵃ is arranged in a plurality of recurved or looped portions indicated at 8, so that a total of approximately thirty feet of one-half inch tubing 8 may be located within the heating chamber. A molten heat transfer medium is confined within the space 7ᵃ and the upper side of the chamber 7 is provided with vent pipes 9. The exterior of the chamber 7 may be heated electrically or by gas flame.

In operating the heat treating chamber along the general line outlined above, the rosin heated to a temperature of 285° C. to 295° C. is allowed to flow at the rate of about one foot per minute (equivalent to 5.5 pounds of rosin per hour) through the tube 4ᵃ into the length of pipe 8 which are preferably surrounded by molten lead as a heated bath. After this treatment for the length of time indicated, the rosin is continuously discharged through the outlet end 5ᵃ into the reservoir 6, from whence it may be withdrawn as desired through a suitable outlet 6ᵃ.

From the foregoing description, it will be obvious that the pipe 4ᵃ, 8 and 5ᵃ need not be a single continuous piece of tubing, but may be formed of a plurality of lengths of tubing positioned in any convenient manner according to the contour of the casing and a variety of which arrangements may be readily effected by the use of stock pieces of pipe and U-shaped connections.

I claim:—

1. The process of producing a high grade distilled rosin, which process comprises treating rosin materials with solvents, spraying the resultant mixture into a zone heated to approximately 340° C. and subjecting all of the material therein to vaporization, fractionally condensing color containing impurities at a relatively high temperature, and fractionally condensing a relatively high grade rosin at a lower temperature.

2. A process of producing a high grade distilled rosin, which process comprises dissolving in a solvent low grade rosin containing coloring matter as impurities to be removed, heating the resulting solution to vaporize the solvent and the said rosin containing colored impurities, fractionally removing colored impurities from the resulting vapors at a relatively high temperature, and thereafter at a temperature lower than that at which colored impurities are removed fractionally condensing from the vapors containing rosin and solvent and from which vapors colored impurities have been removed a relatively high grade rosin.

3. A process of producing a high grade distilled rosin, which process comprises dissolving in a solvent low grade rosin containing coloring matter as impurities to be removed, heating the resulting solution to vaporize the solvent and the said rosin containing colored impurities, fractionally removing colored impurities from the resulting vapors at approximately 270° C., and thereafter at approximately 210° C. fractionally condensing from the vapors containing rosin and solvent and from which vapors colored impurities have been removed a relatively high grade rosin.

4. A process of producing a high grade distilled rosin, which process comprises dissolving in a solvent low grade rosin containing coloring matter as impurities to be removed, heating the resulting solution to vaporize the solvent and the said rosin containing colored impurities, fractionally removing colored impurities from the resulting vapors at approximately 270° C., thereafter at approximately 210° C. fractionally condensing from the vapors containing rosin and solvent and from which vapors colored impurities have been removed a relatively high grade rosin, and recovering rosin oil from the remaining vapors at a condensation temperature of about 170° C.

5. A process of producing a high grade distilled rosin, which process comprises dissolving in a solvent low grade rosin containing coloring matter as impurities to be removed, heating the resulting solution to vaporize the solvent and the said rosin containing colored impurities, fractionally removing colored impurities from the resulting vapors at a relatively high temperature, thereafter at a temperature lower than that at which colored impurities are removed fractionally condensing from the vapors containing rosin and solvent and from which vapors colored impurities have been removed a relatively high grade rosin and subjecting a flowing stream of the recovered, unsolidified relatively high grade rosin to a heat treatment of approximately 285° C. a temperature higher than that at which the rosin was condensed and under nondecomposing conditions for a period of time sufficient to impart the property of non-crystallization to the rosin.

6. A process of producing a high grade distilled rosin, which process comprises dissolving in a solvent low grade rosin containing coloring matter as impurities to be removed, heating the resulting solution to vaporize the solvent and the said rosin containing colored impurities, fractionally removing colored impurities from the resulting vapors at a relatively high temperature, thereafter at a temperature lower than that at which colored impurities are removed fractionally condensing from the vapors containing rosin and solvent and from which vapors colored impurities have been removed a relatively high grade rosin, and subjecting the recovered unsolidified high grade rosin to a heat treatment under non-decomposing conditions at approximately 285° C. while being passed through an elongated heating zone having a diameter of approximately one-half inch; at the rate of about 5.5 pounds of rosin per hour.

In testimony whereof I affix my signature.
ARTHUR R. HITCH.